United States Patent
Koskinen et al.

(10) Patent No.: US 9,936,510 B2
(45) Date of Patent: Apr. 3, 2018

(54) METHOD AND APPARATUS FOR ESTABLISHING CONDITION UNDER WHICH NETWORK ASSISTANCE INFORMATION IS PROVIDED

(71) Applicant: Nokia Technologies Oy, Espoo (FI)

(72) Inventors: Jussi-Pekka Koskinen, Oulu (FI); Ilkka Keskitalo, Oulu (FI); Lars Dalsgaard, Oulu (FI); Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/381,717

(22) PCT Filed: Mar. 15, 2013

(86) PCT No.: PCT/FI2013/050294
§ 371 (c)(1),
(2) Date: Aug. 28, 2014

(87) PCT Pub. No.: WO2013/140033
PCT Pub. Date: Sep. 26, 2013

(65) Prior Publication Data
US 2015/0017998 A1 Jan. 15, 2015

Related U.S. Application Data

(60) Provisional application No. 61/612,688, filed on Mar. 19, 2012.

(51) Int. Cl.
*H04W 72/00* (2009.01)
*H04W 72/04* (2009.01)
(Continued)

(52) U.S. Cl.
CPC ........ *H04W 72/0486* (2013.01); *H04W 8/24* (2013.01); *H04W 24/10* (2013.01); *H04W 72/087* (2013.01)

(58) Field of Classification Search
CPC ..................................................... H04L 12/14
(Continued)

(56) References Cited

U.S. PATENT DOCUMENTS 6,334,047 B1 * 12/2001 Andersson ............ H04W 52/04
455/436
7,412,265 B2 8/2008 Chen et al.
(Continued)

FOREIGN PATENT DOCUMENTS

EP 1599063 A1 11/2005
KR 100846282 7/2008

OTHER PUBLICATIONS

"Further Results on Network Signalling Load and UE Power Consumption", 3GPP TSG-RAN Working Group 2 meeting #77, R2-120367, Agenda : 7.2.1, Nokia Corporation, Nokia Siemens Networks, Feb. 6-10, 2012, 12 Pages.

(Continued)

*Primary Examiner* — Fabricio R Murillo Garcia
(74) *Attorney, Agent, or Firm* — Mintz Levin Cohn Ferris Glovsky and Popeo, P.C.

(57) ABSTRACT

In accordance with an example embodiment of the present invention, an apparatus comprising at least one processor and at least one memory storing computer program code with the at least one memory and the computer program code configured to, with the processor, cause the apparatus at least to: determine whether criteria that defines at least one condition under which assistance information is to be provided to a network has been satisfied; and cause the assistance information to be provided to the network in an instance in which the criteria has been satisfied.

21 Claims, 4 Drawing Sheets

(51) Int. Cl.
    *H04W 24/10*     (2009.01)
    *H04W 72/08*     (2009.01)
    *H04W 8/24*     (2009.01)

(58) Field of Classification Search
    USPC .......................................................... 455/450
    See application file for complete search history.

(56) References Cited

U.S. PATENT DOCUMENTS

| | | |
|---|---|---|
| 2006/0140154 A1 | 6/2006 | Kwak et al. |
| 2006/0251031 A1 | 11/2006 | Anderson et al. |
| 2006/0293066 A1 | 12/2006 | Edge et al. |
| 2007/0072620 A1 | 3/2007 | Levitan |
| 2008/0268845 A1* | 10/2008 | Wu .................... H04W 76/048 455/436 |
| 2009/0124212 A1* | 5/2009 | Islam .................. H04W 72/02 455/70 |
| 2009/0227227 A1* | 9/2009 | Gosnell et al. ............... 455/405 |
| 2010/0008307 A1 | 1/2010 | Torsner et al. |
| 2010/0144299 A1* | 6/2010 | Ren ..................... H04B 1/1615 455/226.1 |
| 2011/0211466 A1* | 9/2011 | Kazmi .............. H04W 52/0261 370/252 |
| 2012/0054661 A1 | 3/2012 | Rados et al. |
| 2012/0106424 A1* | 5/2012 | Davies .............. H04W 52/0261 370/311 |
| 2012/0307700 A1* | 12/2012 | Nordberg .......... H04W 52/0206 370/311 |
| 2012/0320791 A1* | 12/2012 | Guo .................. H04W 52/0212 370/254 |
| 2013/0235780 A1* | 9/2013 | Kim .................. H04W 52/0216 370/311 |
| 2015/0055534 A1* | 2/2015 | Chun ................ H04W 52/0216 370/311 |

OTHER PUBLICATIONS

Kalyanasundaram et al., "Signaling Reduction in Idle Mode for Inter-Technology Mobility", IEEE 65th Vehicular Technology Conference, Apr. 22-25, 2007, 5 Pages.

International Search Report and Written Opinion received for corresponding Patent Cooperation Treaty Application No. PCT/FI2013/050294, dated Jun. 20, 2013, 10 pages.

"Buffer Reporting for E-UTRAN". 3GPPP; TSG RAN; WG2. vol. R2-060829. Mar. 27, 2006. pp. 1-5.

* cited by examiner

METHOD AND APPARATUS FOR ESTABLISHING CONDITION UNDER WHICH NETWORK ASSISTANCE INFORMATION IS PROVIDED

RELATED APPLICATION

This application was originally filed as PCT Application No. PCT/FI2013/050294 filed Mar. 15, 2013 which claims priority benefit from U.S. Application No. 61/612,688 filed Mar. 19, 2012.

TECHNOLOGICAL FIELD

An example embodiment of the present invention relates generally to the provision of network assistance information by a mobile terminal to a network and, more particularly, to the provision of network assistance information in accordance with criteria that defines a condition under which the network assistance information is to be provided.

BACKGROUND

Network assistance information may be useful to allow a network to optimize the network signaling load and/or the power consumption of one or more mobile terminals. Network assistance information may be a combination of information regarding the user activity status and data characteristics. With respect to the user activity status, the network assistance information may include information indicating whether the user is actively utilizing the mobile terminal and, if so, the applications actively utilized by the user and/or information regarding the activity of the mobile terminal over the air interface. With respect to the data characteristics, the network assistance information may include information regarding packet inter-arrival time, quality of service (QoS) requirements, etc.

As noted above, the network may find the network assistance information to be useful in order to, for example, optimize the network signaling load and/or to optimize the power consumption of one or more mobile terminals. In this regard, the network assistance information may allow the network to optimize decisions relating to the setting of a radio resource control (RRC) connection release timer and specific configurations for a mobile terminal, such as the mobile terminal discontinuous reception (DRX) configuration. Notwithstanding the utility of network assistance information, frequent signaling of the network assistance information from a mobile terminal to the network may disadvantageously increase the signaling overhead, thereby potentially reducing or eliminating performance gains that might otherwise be achieved by the network and/or the mobile terminal based upon utilization of the network assistance information.

BRIEF SUMMARY

A method, apparatus and computer program product are provided in accordance with an example embodiment of the present invention in order to provide for the provision of network assistance information based upon satisfaction of a criteria that defines a condition under which the network assistance information is to be provided. The criteria that defines the condition under which the network assistance information is to be provided may be configurable by the network and/or predefined. Various criteria may be defined so as to allow for flexibility in regards to the manner by which the timing in accordance with which a mobile terminal will provide network assistance information to the network is defined. Indeed, the criteria may be based upon one or more of a network allowance, a fixed or configurable timing, an elapsed time since a prior transmission of the network assistance information, a change in a predefined parameter, a state or a state transition of the mobile terminal, usage of the mobile terminal, insufficiency of a power saving configuration of the mobile terminal, a location of the mobile terminal, or satisfaction by a parameter of a predetermined threshold.

BRIEF DESCRIPTION OF THE DRAWINGS

Figure 1:
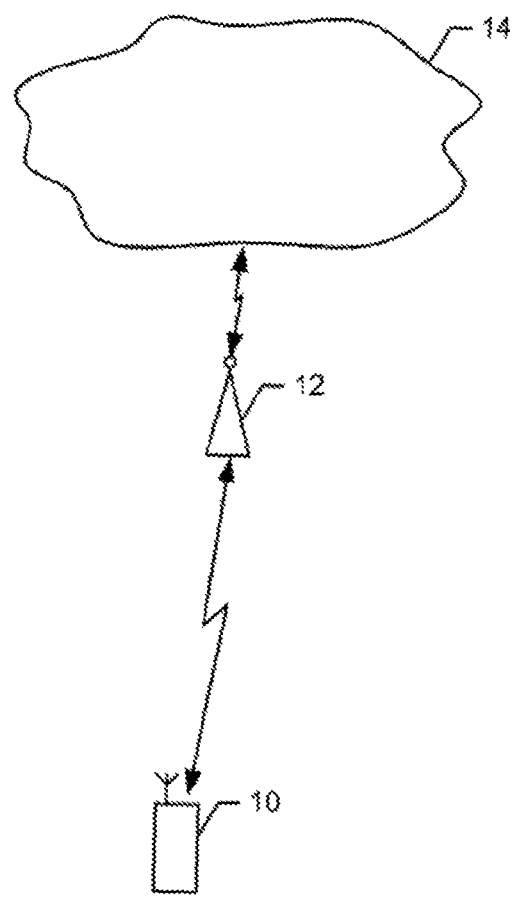
Figure 2:
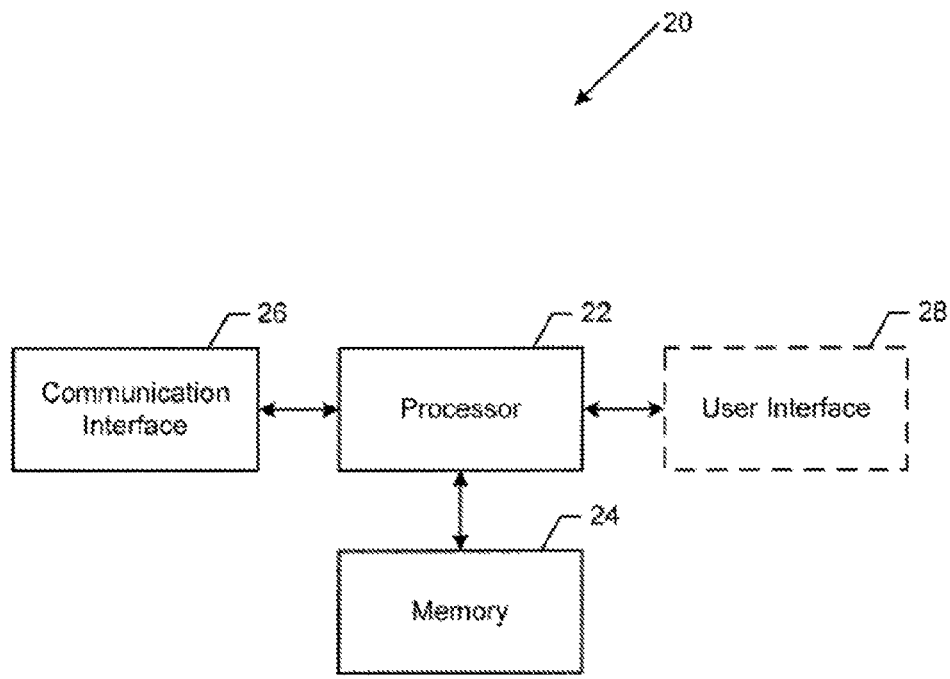
Figure 3:
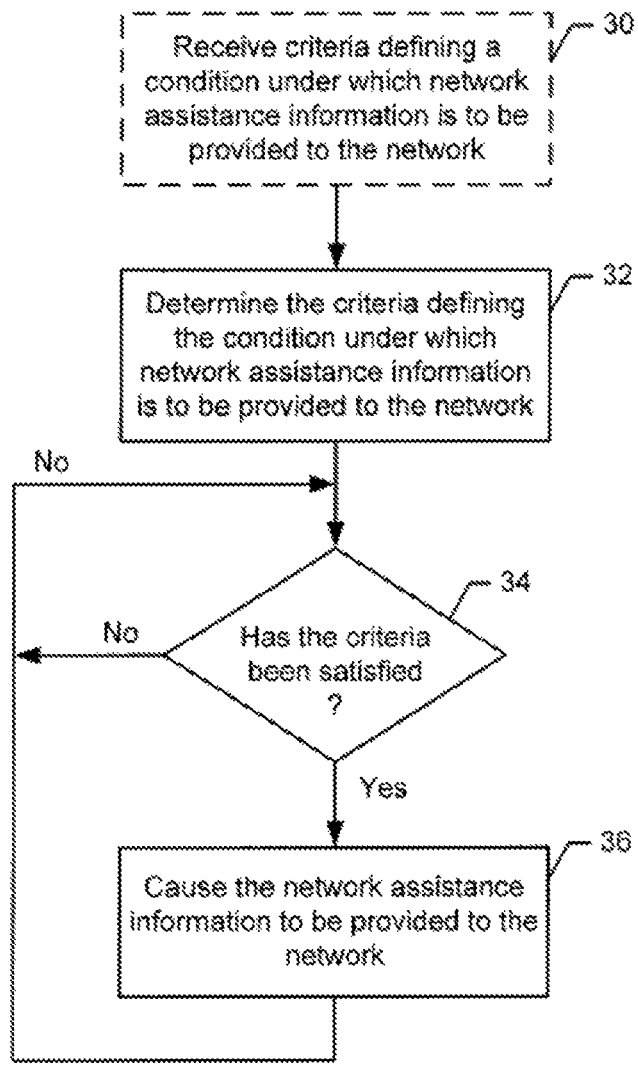
Figure 4:
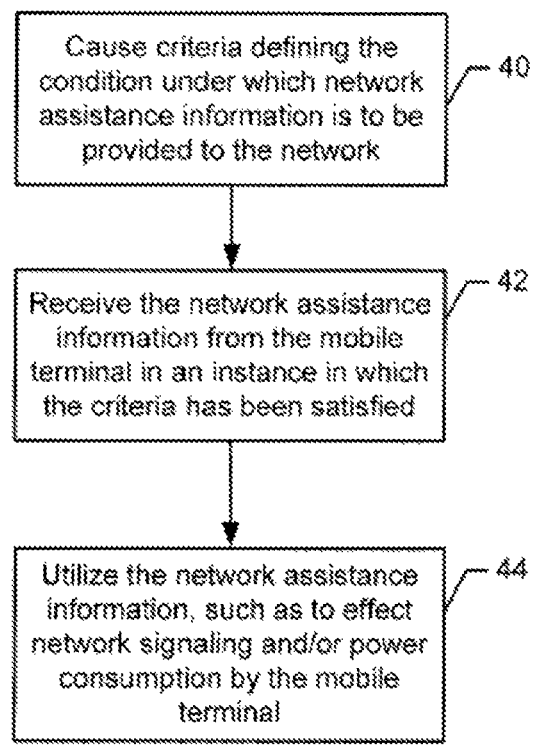

Having thus described certain embodiments of the invention in general terms, reference will now be made to the accompanying drawings, which are not necessarily drawn to scale, and wherein:

FIG. 1 is a block diagram of a system that may be specifically configured in order to support the provision of network assistance information in accordance with an example embodiment of the present invention;

FIG. 2 is a block diagram of an apparatus that may be specifically configured in accordance with an example embodiment of the present invention;

FIG. 3 is a flowchart illustrating operations that may be performed by an apparatus embodied or otherwise included within a mobile terminal in accordance with an example embodiment of the present invention; and FIG. 4 is a flowchart illustrating the operations performed by an apparatus embodied by or otherwise included within a network entity, such as an access point, in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

A method, apparatus and computer program product are provided in accordance with an example embodiment in order to provide for the transmission of network assistance information from a mobile terminal to a network upon the satisfaction of criteria that defines a condition under which the network assistance information is to be provided. As described below, the criteria may be configured by the network or may be predefined, such as based upon an industry standard or the like. As also described below, various criteria may be defined by different embodiments of the present invention in order to provide flexibility with respect to the manner in which the reporting of the network assistance information is to be conducted. Based upon the network assistance information, the network, such as an access point, may improve the network signaling load and/or the power consumption of the mobile terminal.

Although the method, apparatus and computer program product may be utilized by different types of systems, one representation of a system that may be specifically configured in accordance with an example embodiment of the present invention is depicted in FIG. 1. In this regard, a system that supports communications between a plurality of mobile terminals 10 (one of which is illustrated by way of example) and a network 14, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network, via an access point 12 is shown. The mobile terminal may be embodied in any of a variety of manners including as a mobile communication device such as a mobile telephone, personal digital assistant (PDA), pager, laptop computer, tablet computer, or any of numerous other hand held or portable communication devices, computation devices, content generation devices, content consumption devices, or combinations thereof. The mobile terminal may communicate with the network via an access point, such as a base station, a Node B, an evolved Node B (eNB), a relay node or other type of access point.

The mobile terminal 10 and a network entity, such as the access point 12, may each embody or otherwise be associated with an apparatus 20 that is generally depicted in FIG. 2 and that may be configured to perform various operations in accordance with an example embodiment of the present invention as described below, such as in conjunction with FIG. 3 from the perspective of the mobile terminal and FIG. 4 from the perspective of a network entity, such as an access point. However, it should be noted that the components, devices or elements described below may not be mandatory and thus some may be omitted in certain embodiments. Additionally, some embodiments may include further or different components, devices or elements beyond those shown and described herein.

The apparatus 20 may include various means, such as a processor 22, memory 24, communication interface 26 and, in regards to an embodiment in which the apparatus is embodied by a mobile terminal 10, a user interface 28, for performing the various functions herein described. These means of the apparatus as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory) that is executable by a suitably configured processing device (e.g., the processor), or some combination thereof.

The processor 22 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor comprises a plurality of processors. In an example embodiment, the processor is configured to execute instructions stored in the memory 24 or otherwise accessible to the processor. These instructions, when executed by the processor, may cause the apparatus to perform one or more of the functionalities of the mobile terminal as described herein. As such, whether configured by hardware or software methods, or by a combination thereof, the processor may represent an entity configured to perform operations according to embodiments of the present invention when configured accordingly. Thus, for example, when the processor is embodied as an ASIC, FPGA or the like, the processor may comprise specifically configured hardware for conducting one or more operations described herein. Alternatively, as another example, when the processor is embodied as an executor of instructions, the instructions may specifically configure the processor to perform one or more algorithms and operations described herein.

The memory 24 may include, for example, non-transitory volatile and/or non-volatile memory. Although illustrated in FIG. 2 as a single memory, the memory may comprise a plurality of memories. The memory may comprise volatile memory, non-volatile memory, or some combination thereof. In this regard, the memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory may be configured to store information, data, applications, instructions, or the like for enabling the mobile terminal to carry out various functions in accordance with some example embodiments of the present invention. For example, in at least some embodiments, the memory is configured to buffer input data for processing by the processor 22. Additionally or alternatively, in at least some embodiments, the memory is configured to store program instructions for execution by the processor. The memory may store information in the form of static and/or dynamic information.

The communication interface 26 may be embodied as any device or means embodied in hardware, a computer program product comprising computer readable program instructions stored on a computer readable medium (e.g., the memory 24) and executed by a processing device (e.g., the processor 22), or a combination thereof that is configured to receive and/or transmit data from/to a remote device over a network.

In this regard, the communication interface may be configured to transceive data over a public land mobile network (PLMN) network (e.g., a cellular network implementing universal mobile telecommunications service (UMTS) terrestrial radio access network (UTRAN), evolved UTRAN (E-UTRAN) and/or long term evolution (LTE) standards) operated by a network operator. In at least one embodiment, the communication interface is at least partially embodied as or otherwise controlled by the processor. In this regard, the communication interface may be in communication with the processor, such as via a bus. The communication interface may include, for example, an antenna, a transmitter, a receiver, a transceiver and/or supporting hardware or software for enabling communications with other entities of the system, such as for facilitating communication between the mobile terminal 10 and a network entity, such as the access point 12. The communication interface may be configured to receive and/or transmit data using any protocol that may be used for communications between computing devices of the system. The communication interface may additionally be in communication with the memory and/or user interface 28, such as via a bus.

In an embodiment in which the apparatus is embodied by a mobile terminal 10, the apparatus 20 may also include a user interface 28 that may be in communication with the processor 22 to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In one embodiment, the user interface includes user interface circuitry configured to facilitate at least some functions of the mobile terminal by receiving user input and providing output. The user interface may be in communication with the memory 24 and/or communication interface 26, such as via a bus.

Referring now to FIG. 3, the operations performed by an apparatus 20 embodied by or otherwise included within a mobile terminal 10 are illustrated. In this regard, the apparatus may include means, such as the processor 22 or the like, for determining the criteria that defines a condition under which network assistance information is to be provided to a network 14, such as to the access point 12 in communication with the mobile terminal. See block 32. Network assistance information may be a combination of information regarding the user activity status, such as information indicating whether the user is actively utilizing the mobile terminal and, if so, the applications actively utilized by the user and/or information regarding the activity of the mobile terminal over the air interface, and/or data characteristics, such as information regarding packet inter-arrival time, quality of service (QoS) requirements, etc. Other examples of network assistance information include an RRC connection release request, a physical uplink control channel (PUCCH) release request, a DRX configuration message by which the mobile terminal indicates its preferred or suggested DRX parameters to the network, the activity/power saving status of the mobile terminal by which the mobile terminal reports its preference with respect to the trade off between performance and power savings, and the mobile terminal mobility by which the mobile terminal reports its idle mode mobility state information to the access point.

The criteria that defines the condition under which network assistance is to be provided may be predefined, such as in accordance with an industry standard or the like, and may be stored by the memory 24. As such, the determination of the criteria that defines the condition under which the network assistance information is to be provided to the network 14 may include access, such as by the processor 22, of the predetermined criteria stored by the memory. Additionally or alternatively, the criteria that defines the condition under which the network assistance information is to be provided may be provided by the network, such as by broadcast signaling or dedicated signaling. As such, the apparatus 20 embodied by the mobile terminal 22 may include means, such as the processor, the communication interface 26 or the like, for receiving criteria defining the condition under which the network information is to be provided, such as from the network, e.g., an access point. See block 30 of FIG. 3. Upon receipt of the criteria defining the condition under which network assistance is to be provided, the apparatus, such as the processor, may store the criteria, such as in memory, for subsequent retrieval.

Various types of criteria may be defined and various combinations of criteria may be utilized in order to establish the desired timing for the provision of network assistance information from the mobile terminal 10 to the network 14. By way of example, but not of limitation, a number of different types of criteria are defined hereinafter with the method, apparatus and computer program product of various embodiments being configured to utilize any of the criteria individually or in any combination.

In one embodiment, the criteria may include a network allowance indicating whether the network 14 allows the reporting of network assistance information or not such that network assistance information is only provided by the mobile terminal 10 if allowed by the network. In this regard, the network allowance may be associated with a duration, such as a time period, during which the current allowance is effective. For example, a network allowance may indicate that the network desires to receive network assistance information, but the associated duration may impose a time limit such that the network is only interested in receiving the network assistance information during the predefined time period, after which the provision of network assistance information will cease absent further instructions to the contrary.

Additionally or alternatively, the criteria may include a fixed or configurable timing, thereby explicitly defining the timing by which network assistance information may be provided from the mobile terminal 10 to the network 14. In regards to the fixed or configurable timing, the criteria of one embodiment may include an elapsed time since a prior transmission of the network assistance information. Thus, limits may be imposed upon the frequency with which the network assistance information is provided. In this embodiment, a mobile terminal may provide network assistance information to the network. Upon the provision of the network assistance information, a timer, such as a prohibit timer, may be initiated by the mobile terminal, e.g., by the processor 22, and additional network assistance data may not be provided prior to expiration of the timer. Once the timer expires indicative of the elapsed time since the prior transmission of network assistance information, additional network assistance information may then be provided. In one embodiment, additional network assistance information is only provided upon expiration of the timer in an instance in which the current network assistance information is different than the prior network assistance information and, in a further embodiment, is different than the prior network assistance information by a predetermined amount, percentage or the like. The elapsed time measured by the timer may be any predefined value ranging from seconds to minutes or even hours.

Regardless of the fixed or configurable timing and/or the elapsed time since a prior transmission of the network assistance information, the criteria that defines a condition under which the network assistance information is to be provided to the network 14 may be based on a change in a predefined parameter, such as a predefined parameter associated with the operation and/or performance of a mobile terminal 10. In this regard, the criteria of one embodiment may not be satisfied by any change in the predefined parameter, but may only be satisfied by a meaningful change in the predefined parameter as evidenced, for example, by a change in the predefined parameter by at least a predetermined amount, a predetermined percentage or the like. For example, the mobile terminal of one embodiment may not report assistance information (e.g. Inter Arrival Time (IAT)) unless the IAT is greater or smaller than some threshold which may, for example, be configurable by the network.

In one embodiment, the criteria that defines the condition under which network assistance information is provided to the network 14 is based on a state or state transition of the mobile terminal 10. For example, the criteria may be defined in accordance with this embodiment such that the criteria is only satisfied in an instance in which the mobile terminal is in a predefined operational mode, such as an active mode, or in an instance in which the mobile terminal transitions from one operational mode to another, such as from an active mode to an inactive mode or vice versa. Still further, the apparatus 20, e.g., the processor 22, the communication interface 26 or the like, embodied by the mobile terminal may be configured to provide network assistance information in each of two or more different operational modes, but the criteria that defines the condition under which the network assistance information is to be provided to the network in each of the modes may be different, such as by providing for more frequent reporting of network assistance information while the mobile terminal is in an active mode and less frequent reporting of the network assistance information while the mobile terminal is in an inactive mode.

In one embodiment, the network 14 may assume or define the mobile terminal 10 to be in a predefined default mode upon connection establishment, such as a background mode, an active mode or the like. The assumption that will be made by the network regarding the mode of the mobile terminal may be defined during the connection setup phase. For example, the default mode may be specified by an industry standard or provided by the network, such as via dedicated signaling or broadcast signaling. Additionally or alternatively, the default mode may be signaled by the mobile terminal to the network upon connection release, or prior to connection release, or the default mode may be provided by the network to the mobile terminal. In one embodiment, the cause of the connection establishment, e.g., the establishment cause, may affect the assumption made by the network with respect to the mode of operation of the mobile terminal. For example, in an instance in which a mobile terminal provides tracking area update (TAU) signaling, an apparatus 20, e.g., the processor 22, embodied by a network entity, such as the access point 12, may determine that the mobile terminal has remained in a background mode even though the mobile terminal has established a connection. Additionally or alternatively, a mode may be associated in advance with each type of establishment cause so that the mode of operation of the mobile terminal that will be assumed by the network is predetermined once the establishment cause is determined.

In regards to the criteria being based upon the state or state transition of a mobile terminal 10, the criteria may be defined such that the network assistance information is only provided during the connection setup phase and/or in the connected state in an instance in which the mode of the mobile terminal changes, such as in an instance in which a user of the mobile terminal begins to actively utilize the phone in which case the mobile terminal may provide the network with an indication that the mobile terminal has transitioned to an active mode and may thereafter provide the network assistance information. Additionally or alternatively, the network assistance information may be provided on a periodic or other repeated basis during one or more predefined modes of operation, but not during other predefined modes of operation. In this embodiment, the periodic basis by which the network assistance information is provided may be different in one mode of operation than another, such as by being more frequent during an active mode than a background mode. Once the connection is released, such as by movement of the mobile terminal to an RRC_idle state, the network 14, such as an apparatus 20, e.g., the processor 22, embodied by a network entity, such as the access point 12, may determine that the mobile terminal has returned to a background mode or another mode that has been defined as a default mode.

By way of an example, the network 14 and the mobile terminal 10 may be configured to consider the mobile terminal to be in an active mode, at least for a predetermined period of time, commencing with and following the transmission of data from the mobile terminal to the network. The network and the mobile terminal of this embodiment may be configured to consider the mobile terminal to remain in the active state for a predefined period of time with the predefined period of time being extended, such as for another predefined period of time, in an instance in which the mobile terminal transmits additional data during the initial predefined period of time. Alternatively, the network and the mobile terminal of another embodiment may consider the mobile terminal to remain in the active state until the mobile terminal provides the network with an indication as to a change in the mode of operation, such as an indication indicative of the entry of the mobile terminal into a background mode.

In one embodiment, the criteria that defines a condition under which the network assistance information is to be provided to the network 14 may be based on the usage of the mobile terminal 10. In this regard, the criteria may be based upon whether the mobile terminal is being actively utilized or has been left unattended. For example, network assistance information may be provided more regularly while the user is actively utilizing the mobile terminal than in an instance in which the mobile terminal has been left unattended. In this regard, network assistance information may not need to be provided or may be provided less frequently in an instance in which the user has left the mobile terminal unattended since the network assistance information that was previously provided may be considered to still be relevant. Conversely, in an instance in which a user is actively utilizing the terminal, the network assistance information may be provided more frequently since the operation or performance of the mobile terminal and therefore the information provided via the network assistance information may be changing relative to that previously provided to the network. In another embodiment, the method, apparatus and computer program product may be configured such that when user is using actively the mobile terminal then no assistance information is provided to the network. For example, the IAT is changing all the time depending on user actions and it may not be beneficial to provide when user is e.g. browsing, etc. The usage of the mobile terminal may be based upon traffic related parameters, such as the traffic supported by the communication interface 26, which may be indicative of the usage of the mobile terminal.

In one embodiment, the criteria that defines a condition under which the network assistance information is to be provided to the network 14 may be based upon a power saving configuration of the mobile terminal 10, and, in one embodiment, the insufficiency of a power saving configuration of the mobile terminal. For example, in an instance in which the mobile terminal, e.g., the apparatus 20, such as the processor 22, embodied by the mobile terminal, determines that the network is not providing sufficient power saving opportunities, such as otherwise provided by the DRX configuration or relatively short connection release timers, the criteria of this embodiment may be satisfied in order to provide for the provision of network assistance information to the network on a more regular basis.

In another embodiment, the criteria that defines a condition under which the network assistance information is to be provided to the network 14 may include the location of the mobile terminal 10. In this regard, location may be defined in various manners including the geographical location of the mobile terminal, the cell that is serving the mobile terminal, the tracking area (TA) within which the mobile terminal is located, the network, such as the public land mobile network (PLMN) that currently serves the mobile terminal, or the like. In this embodiment, in an instance in which network assistance information has been previously provided by the mobile terminal while the mobile terminal was in the same location as the current location of the mobile terminal, the mobile terminal may not provide additional network assistance information or the mobile terminal may provide additional network assistance information on a less frequent basis. However, in this embodiment, in an instance in which the location of the mobile terminal changes, such as by moving to a different cell, a different TA or a different PLMN, the network assistance information may again be provided to the network or may be provided on a more frequent basis. In this regard, the network assistance information may be provided in conjunction with the movement of a mobile terminal to a different location in various manners, such as by transfer of the prior network assistance information by the network, e.g., the source access point could transfer the prior network assistance information to the target access point, such as via X2 signaling, or the mobile terminal could provide the network assistance information in a message associated with a handover, such as a handover complete message.

In a further embodiment, the criteria that defines a condition under which the network assistance information is to be provided to the network 14 may be based upon the satisfaction by a parameter of a threshold, such as a predetermined threshold or a threshold configured by the network. For example, this criteria may be satisfied in an instance in which a parameter exceeds a predefined minimum value (or falls below a predefined maximum value or falls within a predefined range of values). Various parameters may be utilized in regards to this criteria, such as the inter-arrival time (IAT) of packets or other traffic characteristics. As noted above, for example, the mobile terminal of one embodiment may not report assistance information unless the IAT is greater or smaller than some threshold which may, for example, be configurable by the network.

As indicated in block 34 of FIG. 3, the apparatus 20 embodied by the mobile terminal 10 may include means, such as a processor 22 or the like, for determining whether the criteria has been satisfied. As described above, the criteria may be defined in a number of different manners and may be based upon any combination of one or more individual criterion. In an instance in which the criteria has not been satisfied, the apparatus, such as the processor, embodied by the mobile terminal may continue to repeatedly determine whether the criteria is satisfied. However, in an instance in which it is determined that the criteria has been satisfied, the apparatus embodied by the mobile terminal may include means, such as a processor, communication interface 26 or the like, for causing the network assistance information to be provided to the network 14. See block 36 of FIG. 3. Thereafter, the apparatus, such as the processor, embodied by the mobile terminal may continue to repeatedly determine if the criteria has been satisfied and to report updated network assistance information in an instance in which the criteria has again been satisfied.

Referring now to FIG. 4, the operations performed by an apparatus 20 embodied by a network entity, such as an access point 12, in order to receive and utilize the network assistance information are illustrated. Although the criteria that defines the condition under which the network assistance information is provided to the network 14 may be predefined, such as by an industry standards or the like, the apparatus embodied by a network entity, such as an access point, in accordance with one embodiment, may include means, such as the processor 22, the communication interface 26 or the like, for causing the criteria to be provided to a mobile terminal 10 in one embodiment, as shown in block 40. For example, the network entity, such as the access point, may provide the criteria using broadcast signaling or dedicated signaling. The network entity, such as the access point, of this embodiment may provide the criteria in a variety of manners, but, in one embodiment, may provide the criteria during or in conjunction with connection establishment. Thereafter, the apparatus embodied by the network entity, such as the access point, may include means, such as the processor, the communication interface or the like, for receiving the network assistance information from the mobile terminal in an instance in which the criteria has been satisfied. See block 42 of FIG. 4.

Thereafter, the apparatus 20 embodied by the network entity, such as the access point 12, may include means, such as the processor 22 or the like, for utilizing the network assistance information. See block 44 of FIG. 4. The network entity, such as the access point, may utilize the network assistance information in various manners, such as to effect the network signaling load and/or the power consumption by the mobile terminal 10. For example, the apparatus, such as the processor, embodied by the network entity, such as the access point, may determine the manner in which an RRC connection release time is to be set based at least in part upon the network assistance information. Additionally or alternatively, the apparatus, such as the processor, embodied by the network entity, such as the access point, may define a specific configuration of the mobile terminal, such as the DRX configuration, based at least in part upon the network assistance information. As such, the network signaling load and/or the power consumption of the mobile terminal may be improved based upon the network assistance information, but the signaling overhead created by the provision of the network assistance information from the mobile terminal to the network entity may be managed in accordance with an example embodiment of the present invention so as not to impose an undesirable load upon the network 14.

In one embodiment, a method is provided that includes determining whether criteria that defines a condition under which network assistance information is to be provided to a network has been satisfied. The method of this embodiment also includes causing the network assistance information to be provided to the network in an instance in which the criteria has been satisfied.

In another embodiment, an apparatus is provided that includes at least one processor and at least one memory storing computer program code with the at least one memory and the computer program code configured to, with the processor, cause the apparatus to at least determine whether criteria that defines a condition under which the network assistance information is to be provided to a network has been satisfied. The at least one memory and computer program code of this embodiment are also configured to, with the processor, cause the apparatus to cause the network assistance information to be provided to the network in an instance in which the criteria has been satisfied.

In a further embodiment, a computer program product is provided that includes at least one non-transitory computer-readable storage medium having computer-executable program code portions stored therein with the computer-executable program code portions including program instructions configured to determine whether criteria that defines a condition under which network assistance information is to be provided to a network has been satisfied. The computer-executable code portions of this embodiment also include program instructions configured to cause the network assistance information to be provided to the network in an instance in which the criteria has been satisfied.

In yet another embodiment, an apparatus is provided that includes means for determining whether criteria that defines a condition under which network assistance information is to be provided to a network has been satisfied. The apparatus of this embodiment also includes means for causing the network assistance information to be provided to the network in an instance in which the criteria has been satisfied.

In the foregoing embodiments, the criteria may be based on one or more of a network allowance, a fixed or configurable timing, an elapsed time since a prior transmission of the network assistance information, a change in a predefined parameter, a state or a state transition of a mobile terminal, usage of the mobile terminal, insufficiency of a power saving configuration of the mobile terminal, a location of the mobile terminal or satisfaction by a parameter of a predetermined threshold.

In one embodiment, a method is provided that includes causing criteria that defines a condition under which network assistance information is to be provided by a mobile terminal to be provided to the mobile terminal. The method of this embodiment also includes receiving the network assistance information from the mobile terminal in an instance in which the criteria has been satisfied.

In another embodiment, an apparatus is provided that includes at least one processor and at least one memory storing computer program code with the at least one memory and the computer program code configured to, with the processor, cause the apparatus to at least cause criteria that defines a condition under which network assistance information is to be provided by a mobile terminal to be provided to the mobile terminal. The at least one memory and the computer program code of this embodiment are also configured to, with the processor, cause the apparatus to at least receive the network assistance information from the mobile terminal in an instance in which the criteria has been satisfied.

In a further embodiment, a computer program product is provided that includes at least one non-transitory computer-readable storage medium having computer-executable code portions stored therein with the computer-executable program code portions including program instructions configured to cause criteria that defines a condition under which network assistance information is to be provided by a mobile terminal to be provided to the mobile terminal. The computer-executable program code portions of this embodiment also include program instructions configured to receive the network assistance information from the mobile terminal in an instance in which the criteria has been satisfied.

In yet another embodiment, an apparatus is provided that includes means for causing criteria that defines a condition under which network assistance information is to be provided by a mobile terminal to be provided to the mobile terminal. The apparatus for this embodiment also includes means for receiving the network assistance information from the mobile terminal in an instance in which the criteria has been satisfied.

In the foregoing embodiments, the criteria may be based on one or more of a network allowance, a fixed or configurable timing, an elapsed time since a prior transmission of the network assistance information, a change in a predefined parameter, a state or a state transition of a mobile terminal, usage of the mobile terminal, insufficiency of a power saving configuration of the mobile terminal, a location of the mobile terminal or satisfaction by a parameter of a predetermined threshold.

As described above, FIGS. 3 and 4 are flowcharts of a system, method, and computer program product according to an example embodiment of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the operations described herein may be embodied by computer program instructions of a computer program product. In this regard, the computer program product(s) which embody the operations described herein may be stored by one or more memory devices 24 and executed by a processor 22 of the apparatus 20. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

In some embodiments, certain ones of the operations above may be modified or further amplified. Furthermore, in some embodiments, additional optional operations may be included, such as by shown by blocks 30 having a dashed outline in FIG. 3. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
   determining, at a user equipment, whether a criteria has been satisfied, the criteria defining a plurality of conditions under which the user equipment is to provide, to a mobile network, assistance information including an indication of a power preference of the user equipment, the plurality of conditions including a first condition, a second condition, a third condition, and a fourth condition, the first condition being that the indication of the power preference is to be provided in response to the mobile network allowing the provision of the assistance information, the second condition being that the indication of the power preference is to be provided at an expiry of a timer, the third condition being that the indication of the power preference is to be provided based on the indicated power preference being different from a previously indicated power preference, and the fourth condition being that the indication of the power preference is to be provided in response to the user equipment being in an active mode; and
   providing, by the user equipment, the assistance information to the mobile network, when the criteria has been satisfied.

2. The method according to claim 1, wherein the plurality of conditions includes a fifth condition, the fifth condition being that the indication of the power preference is to be provided in response to a change in a predefined parameter.

3. The method according to claim 1, wherein the plurality of conditions includes a fifth condition, the fifth condition being that the indication of the power preference is to be provided based on at least one of a state or a state transition of the user equipment.

4. The method according to claim 1, wherein the plurality of conditions includes a fifth condition, the fifth condition being that the indication of the power preference is to be provided based at least on a predefined default mode of operation of the user equipment.

5. The method according to claim 1, wherein the plurality of conditions includes a fifth condition, the fifth condition being that the indication of the power preference is to be provided based at least on a usage of the user equipment.

6. The method according to claim 1, wherein the plurality of conditions includes a fifth condition, the fifth condition being that the indication of the power preference is to be provided when a current power saving configuration of the user equipment is insufficient.

7. The method according to claim 1, wherein the plurality of conditions includes a fifth condition, the fifth condition being that the indication of the power preference is to be provided based at least on a location of the user equipment.

8. The method according to claim 1, wherein the power preference comprises whether the user equipment prefers to save power.

9. The method of claim 1, wherein the active mode comprises a radio resource control connected state.

10. An apparatus comprising at least one processor and at least one memory storing computer program code with the at least one memory and the computer program code configured to, with the processor, cause the apparatus at least to:
    determine whether a criteria has been satisfied, the criteria defining a plurality of conditions under which the apparatus is to provide, to a mobile network, assistance information including an indication of a power preference of the apparatus, the plurality of conditions including a first condition, a second condition, a third condition, and a fourth condition, the first condition being that the indication of the power preference is to be provided in response to the mobile network allowing the provision of the assistance information, the second condition being that the indication of the power preference is to be provided at an expiry of a timer, the third condition being that the indication of the power preference is to be provided based on the indicated power preference being different from a previously indicated power preference, and the fourth condition being that the indication of the power preference is to be provided in response to the apparatus being in an active mode; and
    provide the assistance information to the mobile network, when the criteria has been satisfied.

11. The apparatus according to claim 10, wherein the plurality of conditions includes a fifth condition, the fifth condition being that the indication of the power preference is to be provided based at least on a predefined default mode of operation of the apparatus.

12. The apparatus according to claim 10, wherein the plurality of conditions includes a fifth condition, the fifth condition being that the indication of the power preference is to be provided in response to a change in a predefined parameter.

13. The apparatus according to claim 12, wherein the predefined parameter comprises an inter arrival time.

14. The apparatus according to claim 10, wherein the plurality of conditions includes a fifth condition, the fifth condition being that the indication of the power preference is to be provided based on at least one of a state or a state transition of the apparatus.

15. The apparatus according to claim 10, wherein the plurality of conditions includes a fifth condition, the fifth condition being that the indication of the power preference is to be provided when a current power saving configuration of the apparatus is insufficient.

16. The apparatus according to claim 10, wherein the mobile network allows the provision of the assistance information for a period of time during which a network allowance is effective.

17. The apparatus of claim 10, wherein the plurality of conditions includes a fifth condition, the fifth condition being that the indication of the power preference is to be provided based at least on a location of the apparatus.

18. The apparatus of claim 10, wherein the plurality of conditions includes a fifth condition, the fifth condition being that the indication of the power preference is to be provided based at least on a usage of the apparatus.

19. The apparatus of claim 10, wherein the active mode comprises a radio resource control connected state.

20. An apparatus comprising at least one processor and at least one memory storing computer program code with the at least one memory and the computer program code configured to, with the processor, cause the apparatus at least to:
   send, to a user equipment, a criteria defining a plurality of conditions under which the user equipment is to provide, to the apparatus, assistance information including an indication of a power preference of the user equipment, the plurality of conditions including a first condition, a second condition, a third condition, and a fourth condition, the first condition being that the indication of the power preference is to be provided if the provision of the assistance information is allowed, the second condition being that the indication of the power preference is to be provided at an expiry of a timer, the third condition being that the indication of the power preference is to be provided if the indicated power preference is different from a previously indicated power preference, and the fourth condition being that the indication of the power preference is to be provided in response to the user equipment being in an active mode;
   receive the assistance information from the user equipment, in response to the criteria being satisfied; and
   utilize the assistance information.

21. The apparatus according to claim 20, wherein the mobile the provision of the assistance information is allowed for a period of time during which a network allowance is effective.

\* \* \* \* \*